(12) United States Patent
Bush et al.

(10) Patent No.: US 7,592,385 B2
(45) Date of Patent: Sep. 22, 2009

(54) UNIVERSAL SOLVENT CEMENT

(75) Inventors: Charles N. Bush, Bay Village, OH (US); Forest Hampton, III, Elyria, OH (US); Amrit Parhar, North Ridgeville, OH (US)

(73) Assignee: Oatey Company, Cleveland, OH (US)

( * ) Notice: Subject to any disclaimer, the term of this patent is extended or adjusted under 35 U.S.C. 154(b) by 473 days.

(21) Appl. No.: 11/123,262

(22) Filed: May 6, 2005

(65) Prior Publication Data
US 2006/0252865 A1    Nov. 9, 2006

(51) Int. Cl.
*C08K 5/07* (2006.01)
(52) U.S. Cl. ..................... 524/356; 524/556
(58) Field of Classification Search ............... 524/356, 524/556
See application file for complete search history.

(56) References Cited

U.S. PATENT DOCUMENTS

| | | | |
|---|---|---|---|
| 3,284,425 A | 11/1966 | Schroeder et al. | |
| 3,285,888 A | 11/1966 | Brown et al. | |
| 4,246,374 A | 1/1981 | Kopchik | |
| 4,675,354 A | 6/1987 | Sperling | |
| 4,719,149 A | 1/1988 | Aasen et al. | |
| 4,727,117 A | 2/1988 | Hallden-Abberton et al. | |
| 4,880,660 A | 11/1989 | Aasen et al. | |
| 4,942,201 A | 7/1990 | Briggs et al. | |
| 5,073,615 A | 12/1991 | Shen | |
| 5,252,634 A | 10/1993 | Patel et al. | |
| 5,376,717 A | 12/1994 | Patel et al. | |
| 5,416,142 A * | 5/1995 | Bush et al. | 524/113 |
| 5,422,388 A | 6/1995 | Patel et al. | |
| 5,426,129 A | 6/1995 | Emmons et al. | |
| 5,495,040 A | 2/1996 | Patel et al. | |
| 5,562,794 A | 10/1996 | Abel et al. | |
| 5,563,193 A | 10/1996 | Abel et al. | |
| 5,817,708 A | 10/1998 | Congelio et al. | |
| 5,821,289 A | 10/1998 | Congelio et al. | |
| 5,821,293 A | 10/1998 | Roesch et al. | |
| 5,877,236 A | 3/1999 | Roesch et al. | |
| 5,922,798 A | 7/1999 | Roesch et al. | |
| 5,962,560 A | 10/1999 | Congelio et al. | |
| 6,087,421 A | 7/2000 | Patel et al. | |
| 6,372,821 B1 | 4/2002 | Pate et al. | |
| 6,391,950 B1 | 5/2002 | Waldrop | |
| 6,613,186 B2 | 9/2003 | Johnson | |
| 2003/0144386 A1 | 7/2003 | Pakusch et al. | |

FOREIGN PATENT DOCUMENTS

GB    596108    12/1947

OTHER PUBLICATIONS

Abstract from Database WPI, Sec. Ch, Week 197439, Derwent Publications Ltd., London, GB; Cl. A14, AN 1974-68437V, XP002383743, JP 49 011931 (Sekisui Chem Co Ltd), Feb. 01, 1974.
Burke, John, "Solubility Parameters: Theory and Application," http://palimpsest.stanford.edu/byauth/burke/solpar/, Aug. 1984, The Oakland Museum of California.

* cited by examiner

*Primary Examiner*—Robert D. Harlan
(74) *Attorney, Agent, or Firm*—Calfee, Halter & Griswold, LLP

(57) ABSTRACT

A solvent cement for bonding PVC, CPVC and ABS plastic pipe and other molded articles comprises a minor amount of an acrylic resin and one or more solvents capable of dissolving the acrylic resin and further capable of dissolving at least the surfaces of PVC, CPVC and ABS molded articles, wherein the acrylic resin constitutes at least 75 wt. % of the dissolved thermoplastic resin in the cement.

24 Claims, No Drawings

UNIVERSAL SOLVENT CEMENT

BACKGROUND

Solvent cements are widely used for joining plastic pipe and other molded plastic articles made from PVC (polyvinyl chloride), CPVC (chlorinated polyvinyl chloride) and ABS (acrylonitrile-butatdiene-styrene) thermoplastic resins. Such solvent cements are commonly made from one or more solvents for the thermoplastic resin plus a minor amount of the plastic to be bonded. Thus, solvent cements for bonding PVC are typically made from a solvent for PVC plus a minor amount of PVC resin dissolved in the solvent, for example. Solvent cements for CPVC and ABS are typically made in the same way. See, U.S. Pat. No. 5,376,717 to Patel et al., U.S. Pat. No. 5,422,388 to Patel et al., U.S. Pat. No. 6,087,421 to Patel et al. and U.S. Pat. No. 6,372,821 to Patel et al., the disclosures of which are incorporated herein by reference. In some instances, small amounts of additional resins such as acrylic resins can be included. See, for example, the above-noted Patel '388 and Patel '821 patents.

Although these solvent cements work well, they are restricted as a practical matter as they are specific to particular applications. That is to say, solvent cements for PVC are not normally used on CPVC or ABS. In the same way, solvent cements for CPVC are not normally used on PVC or ABS, while solvent cements for ABS are not normally used on PVC or CPVC. The net result is that suppliers and customers must stock all three different types of these cements, i.e., PVC, CPVC and ABS solvent cements, in practice.

Therefore, there is a need for a universal solvent cement, i.e., a solvent cement which are useful on all three different types of plastic, PVC, CPVC and ABS.

SUMMARY

A universal solvent cement in accordance with this disclosure is composed of a minor amount of an acrylic resin and one or more solvents capable of dissolving the acrylic resin and further capable of dissolving at least the surfaces of PVC, CPVC and ABS molded articles, wherein the acrylic resin constitutes at least 75 wt. % of the dissolved thermoplastic resin in the cement. Normally, the combined total of the PVC, CPVC and ABS resins in the solvent cement will be less than 5 wt %.

Also disclosed is a process for bonding PVC, CPVC and ABS plastic pipe and other molded articles to one another, the process comprising applying a solvent cement to the surfaces to be bonded and then bringing these surfaces into contact with one another, wherein the solvent cement comprises a minor amount of an acrylic resin and one or more solvents capable of dissolving the acrylic resin and further capable of at least softening PVC, CPVC and ABS, wherein the acrylic resin constitutes at least 75 wt. % of the dissolved thermoplastic resin in the cement.

In still another embodiment, this disclosure provides a process for using a universal solvent cement to bond different plastics to one another wherein plastic objects made from a first plastic selected from PVC, CPVC and ABS are joined to one another with the universal solvent cement in a first bonding step, and further wherein plastic objects made from a different plastic selected from PVC, CPVC and ABS are joined to one another in a second bonding step with the same universal solvent cement, wherein the solvent cement comprises a minor amount of an acrylic resin and one or more solvents capable of dissolving the acrylic resin and further capable of dissolving at least the surfaces of PVC, CPVC and ABS molded articles, wherein the acrylic resin constitutes at least 75 wt. % of the dissolved thermoplastic resin in the cement.

DETAILED DESCRIPTION

The universal solvent cement disclosed herein is formed from at least one organic solvent plus an acrylic resin dissolved in this solvent.

Acrylic Resin

Acrylic resins useful for making the universal solvent described here are described in U.S. Pat. No. 5,416,142 to Bush et al., the disclosure of which is also incorporated herein by reference. In general, they comprise polymers and copolymers of acrylic esters represented by the general formula $CH_2=C(R^1)C(O)R^5$, wherein $R^1$ is hydrogen or a lower alkyl group containing from 1 to about 6 carbon atoms, and $R^5$ is a lower alkyl group containing from 1 to about 16 or more carbon atoms. More often, $R^1$ is hydrogen or a methyl or ethyl group and $R^5$ is an alkyl group containing from 1 to about 4 carbon atoms. Examples of such acrylic esters include: methyl acrylate, ethyl acrylate, propyl acrylate, isopropyl acrylate, n-butyl acrylate, sec-butyl acrylate, isobutyl acrylate, hexyl acrylate, heptyl acrylate, 2-heptyl acrylate, 2-ethyl hexyl acrylate, dodecyl acrylate, hexadecyl acrylate, methyl methacrylate, methyl ethacrylate, ethyl methacrylate, ethyl ethacrylate, etc.

Acrylic copolymers also can be prepared by copolymerizing an acrylic ester monomer with other monomers such as other acrylic esters, acrylic acid, methacrylic acid, acrylamide, methacrylamide, acrylonitrile, maleimide and N-substituted maleimides such as N-alkylmaleimide, N-cycloalkylmaleimide and N-arylmaleimide, and styrene. Acrylic copolymers can be obtained by polymerizing two or more of the above-described monomeric acrylic esters by procedures well known to those skilled in the art, and many acrylic copolymers are available commercially. The acrylic polymers and copolymers can be made by free radical polymerization initiated by peroxide or azo catalyst, or by redox polymerization. The basic polymerization processes include bulk polymerization, suspension polymerization, emulsion polymerization and solution polymerization.

Normally, such acrylic copolymers will include at least about 50 mol. % acrylic and/or methacrylic ester monomers, more typically at least about 60, 70, 80 or even 90 mol. % acrylic and/or methacrylic ester monomers. Polymers containing at least about 50 mol. % methyl methacrylate, more typically at least about 60, 70, 80, 90 or even 100 mol. % methyl methacrylate, are especially interesting.

Acrylic polymers and copolymers which may be included in the compositions useful in this disclosure are available from a variety of commercial sources. Many acrylic polymers and copolymers are available from Rohm & Haas Company under various trade designations such as "Paraloid," "Acryloid" etc. Specific examples of such acrylic polymers and copolymers include Acryloid B-67, Paraloid K-120N, Paraloid KM-390, Paraloid KM-334 and Paraloid K-130D. Acrylic polymers and copolymers also are available from Kaneka Texas Corp. under such trade designations as FM-10, FM-20 and PA-10. Another group of useful commercial acrylic polymers and copolymers is available from ICI Acrylics, St. Louis, Mo., under the general trade designation "Elvacite Acrylic Resins." For example, Elvacite 2010 is a medium molecular weight polymer of methyl methacrylate; Elvacite 2021 is a high molecular weight polymer of methyl methacrylate; Elvacite 2043 is a low molecular weight polymer of ethyl methacrylate; Elvacite 2044 is a high molecular weight polymer of n-butyl methacrylate; Elvacite 2016 is a low molecular weight copolymer of methyl and n-butyl methacrylates; and Elvacite 2046 is a high molecular weight copolymer of equal parts of n-butyl methacrylate and isobutyl methacrylate.

In one embodiment, the acrylic polymers which are utilized in the compositions of this disclosure are imide-containing acrylic polymers. The imide-containing acrylic polymers and copolymers are available commercially and may be prepared by a variety of procedures. Imidized acrylic polymers may be prepared by reacting an acrylic polymer or acrylic copolymer with ammonia or a primary aliphatic or aromatic monoamine. The imide group is formed by the reaction of the monoamine with two or more of the following groups which may be present in the acrylic polymer: carboxylic acid group, carboxylic ester group, carboxamide (e.g., from methacrylamide), etc. Such imidized acrylic polymers and their preparation have been disclosed in various patents and publications, and such polymers have been referred to as glutarimide acrylic copolymers or polyglutarimides in view of the formation of glutarimide groups when the ammonia or primary amine reacts with the acrylate copolymer. Reactions of ammonia and primary aliphatic amines with acrylate polymers are described in, for example, U.S. Pat. No. 4,246,374 to Kopchik and U.S. Pat. No. 4,727,117 to Hallden-Abberton et al, and a procedure utilizing primary aliphatic amines is described in U.S. Pat. No. 3,284,425, which patents are hereby incorporated by reference for their disclosure of the methods of preparing the imidized acrylic polymers useful in this disclosure.

The imidized acrylic polymers containing glutarimide groups may be characterized by the formula

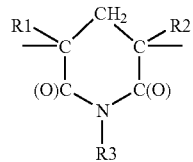

(I)

wherein $R^1$, $R^2$ and $R^3$ are each independently hydrogen or lower alkyl, aryl, alkaryl or aralkyl groups. The term "lower alkyl" is utilized in the present application and claims is intended to include alkyl groups containing from 1 to about 6 carbon atoms such as methyl, ethyl, propyl, butyl, amyl, hexyl, and the various isomers thereof. Generally, $R^1$, $R^2$ and $R^3$ are lower alkyl groups and preferably methyl or ethyl groups.

The imidized acrylic polymers useful in this disclosure also may be characterized as containing repeating units which are characterized by Formula II

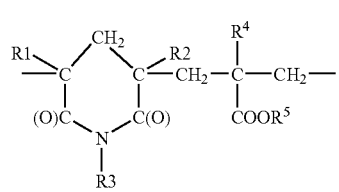

(II)

wherein $R^1$, $R^2$, $R^4$ and $R^5$ are each independently hydrogen or lower alkyl groups containing from 1 to about 6 carbon atoms, and $R^3$ is hydrogen or an alkyl, aryl, alkaryl or aralkyl group. In Formula II, $R^1$, $R^2$, $R^3$, $R^4$ and $R^5$ are generally methyl or ethyl groups, preferably methyl groups.

The acrylic polymers which are reacted with the amines to form the imidized acrylic polymers may be any polymer containing units derived from esters of acrylic or methacrylic acid. The polymer can be single or multiple stage, but in the latter case, the outer or final stage must contain units derived from acrylic or methacrylic acid. While any such acrylic or methacrylic acid ester can comprise the acrylic polymer, generally at least 25% by weight, and more often above about 80% by weight of the acrylic polymer is derived from esters of acrylic or methacrylic acid. The acrylic polymer can be of a wide range of molecular weights and can be in any form.

The degree of imidization of the acrylic polymer is readily controlled by the imidization process, and different degrees can be obtained for different properties desired in the final product. As low as 1% imidization can be achieved, and for the purposes of this invention, at least 5% imidization is desirable. About 100% imidization can be achieved by the process described in U.S. Pat. No. 4,246,374, and in such instances, essentially all of the ester (or acid) groups present in the acrylic polymer are converted to imide moieties. Repeating units characterized by Formula II described above are present in the imidized acrylic polymer when there is less than 100% imidization. As will be noted, the repeating units in Formula II contain acrylic ester units of the formula

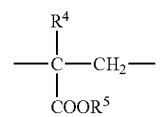

wherein $R^4$ and $R^5$ are each independently hydrogen or a lower alkyl group containing from 1 to about 6 carbon atoms. Examples of imidized acrylic polymers include: poly(methylmethacrylate) with ammonia or methyl amine; a copolymer of methyl methacrylate and ethyl acrylate with ammonia or methyl amine; and a copolymer of methyl styrene and methyl methacrylate with ammonia or methyl amine.

An example of an imidized acrylic polymer, and more particularly, a glutarimide acrylic copolymer which is commercially available is a product designated Paraloid HT-510 from Rohm & Haas Company. This product is reported to be characterized by repeating units of Formula II wherein $R^1$, $R^2$, $R^3$, $R^4$ and $R^5$ are methyl groups. Other polyimide copolymers manufactured and sold by the Rohm & Haas Company include Paraloid EXL-4151, Paraloid EXL-4171, Paraloid EXL-4241 and Paraloid EXL-4261.

Imide-containing acrylic polymers useful in the compositions and methods of the invention may also be prepared by other known techniques. For example, they may be prepared by copolymerization of an alkylacrylate or alkylmethacrylate with maleimide, N-alkylmaleimide, N-cyclohexylmaleimide or N-arylmaleimide, etc.; copolymerization of alkylmethacrylates, maleimide, and/or N-alkyl and/or N-cyclohexyl, and/or N-aryl-maleimides, styrene and/or ring-substituted styrenes or alpha.-methylstyrene; copolymers of styrene, ring-substituted styrenes with maleimide or N-alkyl, or N-cyclohexyl, or N-aryl-maleimides; etc.

In a particular embodiment, the imide-containing acrylic polymers are acrylic polymers prepared by the polymerization (generally free radical) of alkyl methacrylate with maleimide or substituted maleimides. The copolymers can be prepared having a wide range of molecular weights and with a wide range of acrylate group monomers and a wide range of maleimide group monomers.

The methacrylate group monomers include, for example, methyl methacrylate, ethyl methacrylate, etc. The maleimide group monomers include maleimide, N-methylmaleimide, N-ethylmaleimide, N-phenylmaleimide, N-cyclohexylmaleimide, etc. A third monomer may be present which may contain an acrylate group such as ethyl acrylate, propyl acrylate, butyl acrylate, etc. Copolymers can be prepared from mixtures of the first two monomer groups, mixtures of the second and third monomer groups, and mixtures comprising all three groups of monomers. The imide-containing copolymers useful in this disclosure generally will contain 70% or more of the acrylate monomer fraction and up to about 30% by weight of the maleimide monomer fraction. More often the copolymers contain from about 90% to about 99% by weight of the acrylate monomer fraction and from about 1% to about 10% by weight of the imide monomer fraction.

Imide-containing acrylic copolymers such as described above are more fully described in U.S. Pat. No. 5,073,615 which is hereby incorporated by reference for its disclosure of such imide-containing copolymers and their preparation. Such imide-containing copolymers useful in this disclosure are available commercially from ICI Acrylics, Inc., St. Louis, Mo., under the general designation Perspex HHA. HHA-8, HHA-15 and HHA-16 are copolymers obtained from a mixture comprising methyl methacrylate and N-cyclohexylmaleimide.

Mixtures of two or more of the above acrylic resins can also be used. Moreover, homopolymers and copolymers of methyl methacrylate are particularly interesting.

The molecular weights of the acrylic resins used for making the universal solvent described here can vary widely, and essentially any molecular weight can be used. As further discussed below, the viscosity exhibited by a particular solvent cement depends on many factors, including molecular weight of the acrylic resin. Thus, the molecular weight of the acrylic resin chosen for a particular embodiment should be selected in keeping with the desired viscosity of the intended product. Against this background, the weight average molecular weight of the acrylic resin may be as low as 20,000 and as high as 6,000,000. Molecular weights on the order of 34,000 to 4,000,000, and even 400,000 to 3,000,000, are more typical.

In the same way, the concentration of acrylic resin in the solvent cements disclosed here also affects their viscosities, and so the concentration chosen for particular embodiments should also be selected in keeping with the desired viscosity of the intended product. Within this context, acrylic resin concentrations as little as about 3 wt. % can be used, although minimum acrylic resin concentration of at least about 5, 10, 15, 20, 30 or even 40 wt. % are also contemplated. Similarly, acrylic resin concentrations as high as about 60 wt. % can also be used, although maximum acrylic resin concentration of no more than about 50, 40, 30 or even 25 wt. % are also contemplated. Acrylic resin concentrations on the order of 5 to 20 wt. %, or even 7 to 15 wt. %, are typical.

An interesting class of acrylic resins for use in making the solvent cements disclosed here exhibit an inherent viscosity of 0.1 to 1.25, as measured with a solution containing 0.25 g polymer in 50 ml methylene chloride at 20° C. using a No. 50 Cannon-Fenske Viscometer. Another interesting class of acrylic resins exhibit a melt flow rate in the range of 1.6 to 24 as determined by ASTM D-1238. Examples of such acrylic resins include VS 100, available from Arkema, and Elvacite 2008 and Elvacite 2010, both available from Lucite International.

Solvent

The solvent cements disclosed here also contain an organic solvent which is capable of dissolving the acrylic resin in the concentration being used as well as dissolving the surfaces of PVC, CPVC and ABS articles being joined. That is to say, in addition to dissolving the acrylic resin in the concentration being used, the solvent should also be capable of dissolving at least the outermost surface layer of the plastic articles to be bonded, whether those articles are made from PVC, CPVC or ABS.

Although not wishing to be bound to any theory, it is believed that the solvent cements disclosed here achieve adhesive bonding through an intermingling on a molecular level of the acrylic resin of the cement with the polymer forming the article to be bonded. Therefore, the solvent of these cements should be capable of dissolving enough of the surfaces of these articles to enable such an intermingling to occur. There is no particular depth to which the solvent must penetrate for this purpose, since it is a surface phenomenon. On the other hand, solvents which have no solvency at all for PVC, CPVC and/or ABS are not especially effective. In practice, therefore, it is desirable that the solvent exhibit a solvency for PVC, CPVC and ABS of at least about 0.5 wt. %, more desirably at least about 1 wt. %. Solvents capable of dissolving about 5 wt. % or more of all three of these resins are particularly interesting.

Organic solvents of particular interest include acetone (ACE), methyl ethyl ketone (MEK) and other low boiling ketones having boiling points less than 80° C., medium boiling ketones having boiling points of about 80 to 130° C. such as diethyl ketone (DEK), methyl propyl ketone (MPK), methyl iso-propyl ketone (MIPK), methyl iso-butyl ketone (MIBK) and methyl n-butyl ketone (MBK), and high boiling ketones having boiling points greater than 130° C. such as methyl amyl ketone, methyl iso-amyl ketone, di-iso-ketone and ethyl amyl ketone. In one embodiment, cyclic ketones such as cyclohexanone (CYH), cyclopentanone, cycloheptanone and isophorone are avoided. Acetone and methyl ethyl ketone are widely available and inexpensive.

Mixtures of different solvents can also be used, provided that the solvent system as a whole exhibits the same solvency attributes mentioned above. Mixtures of acetone and methyl ethyl ketone are particularly interesting, especially those in which the weight ratio of MEK to ACE is 10:1-1:10, more typically 5:1-1:5, 3:1-1:3, 2:1-1:2, or even about 1:1.

In addition to ketones, the universal cements disclosed here can include any of the additional solvents that are typically used in solvent cements as described, for example, in the patents mentioned above. For example, they may include esters such as methyl acetate, ethyl acetate, ethyl formate, ethyl propionate, and t-butyl acetate; halogenated solvents such as methylene chloride, ethylene dichloride, trichloroethylene; dibasic esters; ethers such as methyl Cellosolve and dioxane; and other liquids such dimethylformamide (DMF) and acyclic pentanones, hexanones and heptanones.

Solvent cements containing DMSO (dimethyl sulfoxide), NMP (N-methylpyrrolidone) and GBL (gamma-butyrolactone) are particularly interesting. On the other hand, THF (tetrahydrofuran) is avoided in some embodiments.

When such additional solvents are used, they are usually present in amounts no greater than about 60 wt. %, based on the total weight of solvent present. More typically they may be present in amounts no more than about 50, 40, 30, 20 or even 10 wt %, based on the total weight of solvent present. Minimum amounts of at least about 2, 5, 10, 20, 30, 40 and 50 wt. %, based on the total weight of solvent present, are contemplated.

Additional Resins

In addition to acrylic resins, the solvent cements disclosed here can contain other dissolved thermoplastic resins including PVC, CPVC and ABS. Any other resin used in or known to be useful as a component of solvent cements can also be included. For example, the homopolymers, copolymers, terpolymers and graft copolymers of vinyl aromatic monomers as described, for example, at col. 10, line 57 et seq. of the above-noted Bush '142 patent can be included. Vinyl pyrrolidone polymers as described at col. 12, line 56 et seq. of the above-noted Bush '142 patent can also be included.

In those embodiments in which an additional resin is present, the acrylic resin should constitute at least about 75 wt. % of the total amount of dissolved resin. Acrylic resin concentrations of at least about 80, 85, 90 and 95 wt. %, based on the total weight of dissolved thermoplastic resin, are also contemplated. Thus, the concentrations of PVC, CPVC and ABS resins in these solvent cements will normally be less than 5 wt. % in total, based on the weight of the entire solvent cement. Solvent cements containing less than about 4, 3, 2 and even 1 wt. % PVC, CPVC and ABS, in total, based on the weight of the entire solvent cement are also contemplated. Solvent cements essentially completely free of PVC, CPVC and ABS are particularly interesting.

Because the concentrations of PVC, CPVC and ABS in such solvent cements are kept low or non-existent, compatibility problems between different resins, e.g., PVC vs. CPVC, PVC vs. ABS and CPVC vs. ABS, are avoided. That is to say, because PVC, CPVC and ABS resins are essentially avoided, compatibility problems between one type of resin in the cement, PVC for example, and a different type of resin in the pipe to be bonded, ABS for example, are avoided. This avoidance of compatibility problems, on the one hand, plus the use of an organic solvent system which dissolves the acrylic resin and is capable of dissolving at least the outermost surface layer of the plastic articles to be bonded, on the other hand, enables the solvent cement disclosed here to create excellent bonds on all three different types of plastic, i.e. PVC, CPVC and ABS. Thus, the solvent cement disclosed here is universal in its applications.

That is to say, the universal solvent cement disclosed here can be used to bond two different plastics selected from PVC, CPVC and ABS to one another. In addition, it can also be used in different bonding operations in which a first group of objects made from the one plastic selected from PVC, CPVC and ABS are joined in a first bonding step, and then another group of objects made from a different plastic also selected from PVC, CPVC and ABS are joined to one another in a second bonding step using the same solvent cement. In this context, PVC, CPVC and ABS are "different" from one another. Two PVC resins are not, even if they differ from one another in terms of molecular weight or other property.

Other Ingredients

The universal solvent cements disclosed here can contain from 0 to about 4% or even up to 5% by weight of at least one solid particulate inorganic filler. More typically, they will contain about 0.1% or 0.75% by weight up to about 1.5% or 3% or 4% by weight of the solid particulate inorganic filler. The particulate inorganic fillers are inert and are generally included in the solvent cements disclosed here to improve working viscosity and structural strength, and to reduce costs.

The solid particulate inorganic fillers incorporated into the solvent cements disclosed here preferably are fine powders having an average particle size of less than about 50 microns and a density of less than about 4 g/cc. These inorganic fillers include amorphous silica, silica flour, ground quartz, talc, magnesium silicate, calcium carbonate, clay, whiting, shell flour, wood flour, alumina, antimony trioxide, asbestos powder, barium sulfate, Calcined clays, China clays, magnesium oxide, mica powder, fumed silica, etc. A preferred filler is fumed silica available commercially from Cabot Corporation under the trade designation CAB-O-SIL and from the Degussa Corporation under the trade designation Aerosil. For example, CAB-O-SIL grade PTG is a fumed silica available from the Cabot Corporation and having a surface area of $200\pm25$ m$^2$/g and a nominal particle diameter of 0.014 microns.

If desired, other components may be advantageously included in the compositions although the compositions of the invention generally are free of hollow microspheres. Other components can include lubricants, stabilizers, plasticizers, colorants, pigments, thixotropic agents, polymeric rheology additives and processing aids, etc. Small amounts of pigments or colorants such as titanium dioxide, carbon black or a dye or other colorant may be added to the adhesive compositions to serve as a guide for uniform mixing and to provide a method of identifying various adhesive compositions. Exemplary stabilizing agents for PVC and CPVC formulations include alkyltin compounds such as methyltin, butyltin and octyltin; dialkyltin dicarboxylates; methyltin mercaptides and butyltin mercaptides; dialkyltin bis(alkylmercaptocarboxylate) including di-n-octyltin-S,S'-bis(isooctyl mercaptoacetate); butylthiostannoic acid; etc. Di-lower alkyl tin stabilizers such as $C_4$ to $C_8$ alkyltin mercaptides are normally preferred. The stabilizers are generally present in amounts of from about 0.05 to 3% by weight. Triphenyl phosphite, BHT (butylated hydroxy toluene), complex calcium and zinc soaps of alkyl carboxylic acids and hydrotalcite can also be used.

The compositions of this disclosure are easy to apply, cost effective, and cure within a reasonable period of time without the use of heat, pressure, UV light or extraordinary mechanical devices. The bonding or adhesive properties are satisfactory for the intended uses whether non pressure drain, waste, vent (DWV), applications or pressure systems used in potable water applications.

Viscosity

The solvent cements disclosed here should be thoroughly blended to provide substantially homogeneous mixtures. Substantially homogeneous mixtures are desirable since non-uniform mixtures will result in non-uniform distribution of the adhesive composition and non-uniform adhesion to substrate surfaces.

The viscosities of these solvent cements can be as low as 1 cps (centipoise) and as high as 50,000 cps. "Regular" solvent cements normally have viscosities on the order of 1-500 cps, more commonly 90 to 200 cps. Similarly, "Medium Duty" solvent cements normally have viscosities on the order of 500-2,000 cps, more commonly 800 to 1500 cps., while "heavy duty" solvent cements normally have viscosities on the order of 1,600 to 4,000 cps, more commonly 1,600 to 2,500 cps.

As indicated above, the viscosity exhibited by a particular solvent cement depends on many factors including the concentration and molecular weight of the dissolved acrylic resin. Additional factors affecting viscosity include the concentrations and molecular weights of other dissolved resins, the types and amounts of fillers, desired shelf stability, types and amounts of solvents, etc. Those skilled in this field can readily determine the concentration and molecular weights of the acrylic resin and other ingredients in the solvent cements disclosed here to achieve a desired viscosity.

EXAMPLES

In order to more thoroughly describe this disclosure, the following working examples are provided.

In these examples, a variety of different solvent cements were produced, and then the viscosities of each cement was determined immediately after the cement was made and then periodically over the next four weeks by ASTM D-1084 using a Brookfield viscometer. Each solvent cement was tested according to ASTM D-2564 to determine the lap shear strength of the bond created when the cement was used to bond PVC to PVC. These tests were also repeated over a four week period of time.

The compositions of the various solvent cements tested are set forth in the following Table A, while the viscosities of these solvents cements are set forth in the following Table B and the bond strengths produced by these cements are set forth in the following Table C. In these tables, the following abbreviations are used:

| Abbrev | Polymer or Solvent | Source |
|---|---|---|
| K-120N | Poly(EA/MMA) | Rohm & Haas |
| Elvacite 2041 | PMMA | Lucite International |
| Plaskolite | Imidized PMMA | Plaskolite Continental |
| CA 41 | Poly(EA/MMA) | Plaskolite Continental |
| K 400 | Poly(BA/BMA/MMA) | Rohm & Haas |
| Elvacite 2008 | PMMA | Lucite International |
| V052 | Poly(EA/MMA) | Arkema |
| V052 | Poly(EA/MMA) | Arkema |
| t-bac | t-butyl acetate | |
| K130D | Poly(BA/MMA) | Rohm & Haas |

TABLE A

Solvent Cement Compositions

| Example | DMSO | NMP | MEK | Acetone | Misc | PVC | Acrylic | F.S. |
|---|---|---|---|---|---|---|---|---|
| 1 | | 45.0 | | 45.0 | | | 10.0 | K120N |
| 2 | | 5 | 42.5 | 42.5 | | | 10 | 2041 resin |
| 3 | | 10 | 40.0 | 40.0 | | | 10 | 2041 resin |
| 4 | 45.0 | | 45.0 | | | | 10 | K120N |
| 5 | 44.4 | | 44.4 | | | | 11.2 | K120N |
| 6 | | | 40.0 | 40.0 | | | 20 | |
| 7 | 35.0 | | 35.0 | 20.0 | | | 10k | |
| 8 | 43.75 | | 43.75 | | | | 12.5k | K120N |
| 9 | 47.5 | | 47.5 | | | | 5k | |
| 10 | 31.7 | | 31.7 | 31.6 | | | 5k | |
| 11 | 29.2 | | 29.2 | 29.2 | | | 12.5k | |
| 12 | 30.0 | | 30.0 | | 30.0 | | 10k | 30 Methyl Acetate |
| 13 | 46.5 | | 46.5 | | | | 5k | 2.0 |
| 14 | 29.2 | | 29.2 | 29.2 | | | 12.5p | |
| 15 | 43.8 | | 43.8 | | | | 12.5p | |
| 16 | 45.0 | | 45.0 | | 7.5k | | 2.5p | K120N + Plaskolite |
| 17 | 45.00 | | 45.00 | | | | 10 | K120N |
| 18 | 46.25 | | 46.25 | | | | 7.5 | K120N |
| 19 | 30.00 | | 30.00 | 30.0 | | | 10 | K120N |
| 20 | 30.80 | | 30.80 | 30.8 | | | 7.5 | K120N |
| 21 | 43.75 | | 43.75 | | | | 12.5 | |
| 22 | 45.00 | | 45.00 | | | | 10 | |
| 23 | 20.00 | | 70.00 | | | | 10 | K120N |
| 24 | 43.75 | | 43.50 | | | | 12.5 | K120N |
| 25 | 20.00 | | 35.00 | 35.0 | | | 10 | K120N |
| 26 | 10.00 | | 40.00 | 40.0 | | | 10 | K120N |
| 27 | 43.75 | | 43.75 | | 12.5 | | | CA41 |
| 28 | 30.00 | | 30.00 | 30.0 | 10.0 | | | K400 |
| 29 | 45.00 | | | 45.0 | | | 10 | MIBK, K120N |
| 30 | 45.00 | | 45.00 | | 5.0 | | 5 | Plaskolite, K120N |
| 31 | 30.00 | | 30.00 | 30.0 | | | 10 | 2041 |
| 32 | 30.00 | | 30.00 | 30.0 | | | 10 | 2008 |
| 33 | 30.00 | | 30.00 | 30.0 | | | 10 | V052-100 |
| 34 | 30.00 | | 30.00 | 30.0 | | | 10 | V825-100 |
| 35 | 20.00 | | 20.00 | 25.0 | 25.0 | | 10 | K120N + t-bac |
| 36 | 30.00 | | | 30.0 | 30.0 | | 10 | 2041 + t-bac |
| 37 | | | 90.00 | | | | 10.0 | K120N |
| 38 | | | | 90.0 | | | 10 | K120N |
| 39 | | | 44.00 | 44.00 | | | 12 | 2041 |
| 40 | | | 40.00 | 40.00 | | 5 | 15 | Plaskolite |
| 41 | 20.00 | | 40.00 | 30.00 | | | 10 | K130D |

TABLE B

Viscosities, cps.

| Example | As Made | 24 hrs | 1 wk | 2 wk | 3 wk | 4 wk | 10 mo. |
|---|---|---|---|---|---|---|---|
| 1 | 390 | 460 | 470 | 480 | 480 | 490 | |
| 2 | 40 | 40 | 40 | 40 | 40 | 40 | |
| 3 | 40 | 40 | 40 | 40 | 40 | 40 | |
| 4 | 620 | 670 | 680 | | 670 | | 770 |

TABLE B-continued

Viscosities, cps.

| Example | As Made | 24 hrs | 1 wk | 2 wk | 3 wk | 4 wk | 10 mo. |
|---|---|---|---|---|---|---|---|
| 5 | 900 | 900 | | | 920 | 1040 | 1000 |
| 6 | 80 | 80 | 80 | 80 | 80 | 80 | |
| 7 | 420 | 540 | 480 | 460 | 490 | 480 | |
| 8 | 2100 | 2200 | 2250 | 2300 | 2200 | 2425 | |
| 9 | 10 | 12 | 20 | | 40 | 20 | |
| 10 | 10 | 10 | | | | | |
| 11 | 1290 | 1430 | 1390 | | | 1690 | |
| 12 | 450 | 480 | 490 | 461 | 500 | 490 | |
| 13 | 140 | | | | | | |
| 14 | 10 | 35 | 36 | 36 | 37 | 38 | |
| 15 | 48 | 49 | 47 | | | 49 | |
| 16 | 220 | 250 | 230 | 240 | | 260 | |
| 17 | 470 | 540 | 560 | 520 | 570 | | |
| 18 | 140 | 140 | 130 | 140 | 140 | | |
| 19 | 320 | 330 | 340 | 330 | 360 | 360 | |
| 20 | 80 | 80 | 90 | 80 | 80 | 80 | |
| 21 | 2220 | 2610 | 2830 | 2710 | 2800 | 2900 | |
| 22 | 530 | 610 | 640 | 620 | 700 | 660 | |
| 23 | 240 | | 270 | 270 | | 260 | |
| 24 | 2000 | 2000 | 2000 | 2150 | 2250 | 2250 | |
| 25 | 250 | 270 | 260 | 250 | 250 | 250 | |
| 26 | 200 | 200 | 200 | 200 | 200 | 200 | |
| 27 | 33 | 34 | 34 | 34 | 34 | | |
| 28 | 25500 | too thick | | | | | |
| 29 | 730 | 780 | | 780 | 810 | 800 | |
| 30 | 80 | 80 | 70 | 80 | 70 | 60 | |
| 31 | 120 | 120 | | | | 120 | |
| 32 | 12 | 12 | | | | | |
| 33 | 25 | 25 | 26 | | | | |
| 34 | 22 | 24 | | | | | |
| 35 | 350 | 360 | 370 | 360 | | 380 | |
| 36 | 230 | 230 | 250 | 240 | | 260 | |
| 37 | 150 | 150 | 180 | 170 | | 160 | |
| 38 | 150 | 170 | 190 | 200 | | 190 | |
| 39 | 220 | 210 | 250 | 250 | | | |
| 40 | 100 | 110 | 110 | 120 | 110 | | |
| 41 | 1150 | 1200 | 1200 | | | | |

TABLE C

Lap Shear Strengths, psi

| Example | 2 hrs | 16 hrs | 72 hrs | 1 wk | 4 wk |
|---|---|---|---|---|---|
| 1 | 237 | 756 | 1141 | 1386 | |
| 2 | 578 | 1114 | 1446 | | |
| 3 | 527 | 1034 | 1455 | 1500 | |
| 4 | 422 | 915 | 1176 | 1289 | 957 (6 mo) |
| 5 | 301 | 595 | 975 | 950 | |
| 6 | | 1134 | 1274 | 1404 | 941 |
| 7 | 334 | 566 | 1089 | 1478 | 1500 |
| 8 | 389 | 638 | 1300 | 1490 | 1304 |
| 9 | 479 | 666 | 1372 | 949 | |
| 10 | 419 | 564 | 1413 | 1336 | |
| 11 | 330 | 585 | 1090 | 1015 | |
| 12 | 344 | 477 | 1239 | 926 | 1500 |
| 13 | na | na | 1071 | na | |
| 14 | 504 | 928 | 1459 | | |
| 15 | 281 | 783 | 1004 | 1392 | |
| 16 | 347 | 767 | 1233 | 1421 | |
| 17 | 479 | 1190 | 920 | 1024 | |
| 18 | 305 | 1160 | 941 | 1103 | 1475 |
| 19 | 336 | 925 | 1150 | | 1381 |
| 20 | 330 | 1036 | 1175 | | |
| 21 | 350 | 994 | 1017 | | |
| 22 | 490 | 1347 | 1221 | | |
| 23 | 359 | 524 | 1104 | 1266 | 1409 |
| 24 | 294 | 712 | 1400 | 1491 | 1500 |
| 25 | 408 | 535 | 1500 | 1500 | 1328 |
| 26 | 378 | 609 | 1500 | 1500 | 1125 |
| 27 | | | | | |
| 28 | too thick | | | | |

TABLE C-continued

Lap Shear Strengths, psi

| Example | 2 hrs | 16 hrs | 72 hrs | 1 wk | 4 wk |
|---|---|---|---|---|---|
| 29 | 261 | 488 | 740 | 893 | |
| 30 | 260 | 642 | 988 | 1137 | |
| 31 | 446 | 754 | 1487 | 1482 | |
| 32 | 305 | 787 | 1500 | | 1465 |
| 33 | 380 | | | | |
| 34 | | | | | |
| 35 | 324 | | 646 | | |
| 36 | 297 | | 920 | | |
| 37 | 327 | | 740 | 1113 | 1245 |
| 38 | 334 | 528 | 1124 | 938 | 1062 |
| 39 | | | | 1500 | |
| 40 | 441 | 835 | 1435 | | |
| 41 | | 999 | | | |

From the above, it can be seen that solvent cements formulated in accordance with this disclosure provide excellent bond strengths for 72 hours and longer in adhering PVC objects to one another, even though these cements contain no PVC resin. Thus, most solvent cements provided lap strengths of at least about 900 psi after 72 hours, while many provided lap strengths of about 1100 or even 1200 or more after 72 hours. In addition, their viscosities remained largely unchanged for four weeks and longer, indicating commercially viable storage stabilities of two years and longer.

Although only a few embodiments have been shown above, it should be appreciated that many modifications can be made without departing from the spirit and scope of the technology described above. All such modifications are intended to be included with the scope of this technology, which is to be limited only by the following claims:

The invention claimed is:

1. A solvent cement for bonding PVC (polyvinyl chloride), CPVC (chlorinated polyvinyl chloride) and ABS (acrylonitrile-butadiene-styrene) plastic pipe and other molded articles, the solvent cement comprising at least one thermoplastic resin dissolved in a solvent mixture containing MEK (methyl ethyl ketone) and ACE (acetone) in which the weight ratio of MEK to ACE is 10:1-1:10, wherein at least 75 wt. % of the dissolved thermoplastic resin in the cement is an acrylic resin, and further wherein the maximum amount of acrylic resin in the cement is 60 wt. %.

2. The solvent cement of claim 1, wherein the total amount of PVC, CPVC and ABS resins in the solvent cement is less than 5 wt. %, based on the total weight of the solvent cement, and further wherein the maximum amount of acrylic resin in the cement is 50 wt. %.

3. The solvent cement of claim 2, wherein the acrylic resin contains at least 50 mol % of polymerized methyl methacrylate.

4. The solvent cement of claim 1, wherein the solvent cement contains DMSO (dimethyl sulfoxide).

5. The solvent cement of claim 4, wherein the solvent cement contains NMP (N-methyl pyrrolidone).

6. The solvent cement of claim 1, wherein the solvent cement is essentially free of THF tetrahydrofuran and CYH cyclohexanone.

7. A solvent cement for bonding PVC (polyvinyl chloride), CPVC (chlorinated polyvinyl chloride) and ABS (acrylonitrile-butadiene-styrene) plastic pipe and other molded articles, the solvent cement comprising a at least one thermoplastic resin dissolved in a solvent system comprising one or more solvents capable of dissolving the thermoplastic resin and further capable of dissolving at least the surfaces of PVC, CPVC and ABS molded articles, wherein, at least 75 wt. % of the dissolved thermoplastic resin in the cement is an acrylic resin, and further wherein the maximum amount of acrylic resin in the cement is 60 wt. %, and further wherein the solvent system contains at least one of DEK (diethyl ketone), MPK (methyl propyl ketone), MIPK (methyl iso-propyl ketone), MIBK (methyl iso-butyl ketone), MBK (methyl n-butyl ketone), methyl amyl ketone, methyl iso-amyl ketone, d-iso-ketone and ethyl amyl ketone.

8. The solvent cement of claim 7, wherein the solvent cement further contains acetone.

9. The solvent cement of claim 7, wherein the acrylic resin constitutes at least 85 wt. % of the dissolved thermoplastic resin in the cement.

10. The solvent cement of claim 9, wherein the acrylic resin constitutes at least 90 wt. % of the dissolved thermoplastic resin in the cement.

11. The solvent cement of claim 10, wherein the total amount of PVC, CPVC and ABS resins in the solvent cement is less than about 5 wt. %, based on the total weight of the solvent cement, and further wherein the maximum amount of acrylic resin in the cement is 50 wt. %.

12. The solvent cement of claim 9, wherein the total amount of PVC, CPVC and ABS resins in the solvent cement is less than about 3 wt. %, based on the total weight of the solvent cement.

13. The solvent cement of claim 1, wherein the acrylic resin constitutes at least 85 wt. % of the dissolved thermoplastic resin in the cement.

14. The solvent cement of claim 13, wherein the acrylic resin constitutes at least 90 wt. % of the dissolved thermoplastic resin in the cement.

15. The solvent cement of claim 14, wherein the total amount of PVC, CPVC and ABS resins in the solvent cement is less than about 3 wt. %, based on the total weight of the solvent cement.

16. The solvent cement of claim 13, wherein the total amount of PVC, CPVC and ABS resins in the solvent cement is less than about 3 wt. %, based on the total weight of the solvent cement.

17. The solvent cement of claim 16, wherein the total amount of PVC, CPVC and ABS resins in the solvent cement is less than about 2 wt. %, based on the total weight of the solvent cement.

18. The solvent cement of claim 1, wherein the solvent mixture comprises MEK, ACE (acetone) and at least one optional additional solvent present in an amount of no greater than about 60 wt. % based on the weight of the solvent mixture.

19. The solvent cement of claim 18, wherein the solvent mixture comprises MEK, ACE and at least one optional additional solvent present in an amount of no greater than about 40 wt. % based on the weight of the solvent mixture.

20. The solvent cement of claim 18, wherein the acrylic resin constitutes at least 85 wt. % of the dissolved thermoplastic resin in the cement.

21. The solvent cement of claim 20, wherein the acrylic resin constitutes at least 90 wt. % of the dissolved thermoplastic resin in the cement.

22. The solvent cement of claim 21, wherein the total amount of PVC, CPVC and ABS resins in the solvent cement is less than about 3 wt. %, based on the total weight of the solvent cement.

23. The solvent cement of claim 20, wherein the total amount of PVC, CPVC and ABS resins in the solvent cement is less than about 3 wt. %, based on the total weight of the solvent cement.

24. The solvent cement of claim 23, wherein the total amount of PVC, CPVC and ABS resins in the solvent cement is less than about 2 wt. %, based on the total weight of the solvent cement.

* * * * *

UNITED STATES PATENT AND TRADEMARK OFFICE
CERTIFICATE OF CORRECTION

PATENT NO. : 7,592,385 B2  Page 1 of 1
APPLICATION NO. : 11/123262
DATED : September 22, 2009
INVENTOR(S) : Bush et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this

Twenty-first Day of September, 2010

David J. Kappos
*Director of the United States Patent and Trademark Office*